June 21, 1966   J. GONSKI   3,256,973
FLIGHT CONVEYOR
Filed Feb. 25, 1964
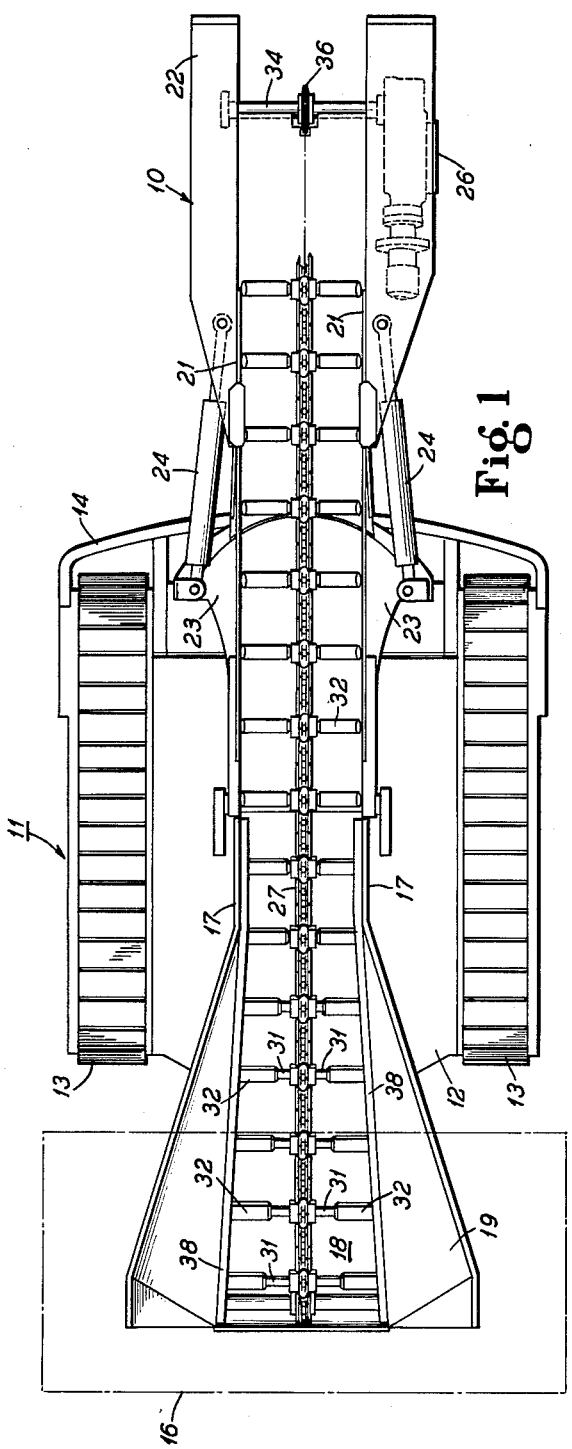
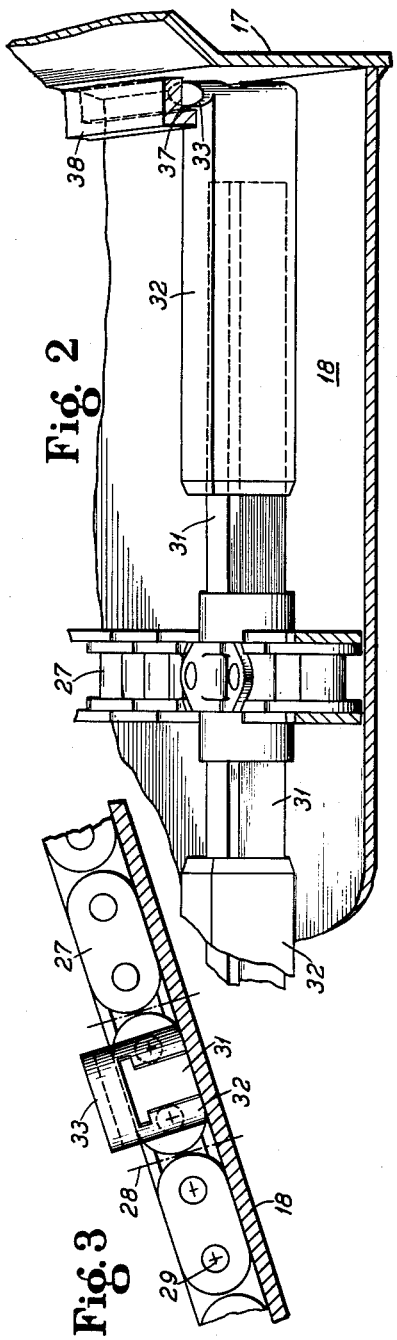
INVENTOR.
Joseph Gonski
BY Herman E. Smith
ATTORNEY

United States Patent Office 3,256,973
Patented June 21, 1966

3,256,973
FLIGHT CONVEYOR
Joseph Gonski, Chicago, Ill., assignor to Goodman Manufacturing Company, Chicago, Ill., a corporation of Illinois
Filed Feb. 25, 1964, Ser. No. 347,196
5 Claims. (Cl. 198—171)

The present invention relates generally to flight conveyors and more particularly to an arrangement of a trough and flights therefor.

In many conveying applications, it is desirable to gather material from a low wide place for discharge at a higher level in a deeper, narrower stream. For example, in coal loading machines, broken and dislodged coal is swept from the floor by oscillating arms and piled up on a central flight conveyor which conducts the material rearwardly to a haulage device. In other machines, such as continuous mining machines, the broken material may be piled up by plow-like sweeps attached to the boring heads. In each of these examples, the portion of the material piled directly above the conveyor flights is carried rearwardly with the result that the depth of the material bed above the flights remains approximately the same or slightly diminished toward the rear.

It is an object of the present invention to provide an improved conveyor having variable width flights adapted to move a stream of material into a deeper, narrower bed conforming to the lateral contours of a variable width conveyor trough.

A further object is to provide a conveyor having telescoping flights adapted to sweep the floor between a pair of walls, the width of said floor varying from place to place along the length of said conveyor.

A still further object is to provide a conveyor having telescopically slideable flights adapted to follow the contour of a preselected track.

Other objects and advantages will become apparent from the following description together with the drawing.

In the drawing:

FIGURE 1 is a plan view of a conveyor according to the present invention mounted on a mobile machine;

FIGURE 2 is a fragmentary view, to enlarged scale, of a variable length flight in a conveyor trough; and FIGURE 3 is an end view of the flight shown in FIGURE 2.

Referring now more particularly to the drawing, the numeral 10 indicates a flight conveyor mounted on a mobile machine 11. The machine 11 may be a loader, surge bin or mining machine and is here shown in a simplified version since such machines are well known to those familiar with coal mining machinery. Generally, the machine 11 has a frame 12 supported for mobility on tractor treads 13. Frame 12 supports the conveyor 10. A bumper 14 may be mounted at the rear end of frame 12 for protection from shuttle cars and the like. A rectangular area is designated at the front of the machine by reference character 16 to indicate the general location of a loading head or mining head.

Conveyor 10 has a pair of sidewalls 17 spaced laterally from each other by a bottom portion 18. The lateral spacing of sidewalls 17 varies along the length of the conveyor to provide wider and narrower portions. For example, sidewalls 17 are wider apart at the front of the machine to form a mouth or throat. The walls converge toward each other to form a narrower conveying channel toward the rear. Front portions 19 of sidewalls 17 are bent outwardly to provide a hopper configuration above the throat portion of the conveyor. Spring plates 21 form a flexible portion of sidewalls 17 in the vicinity of a vertical pivot axis which permits lateral swinging movement of boom portion 22. Wing portions 23 extend laterally beyond sidewalls 17 in the vicinity of spring plates 21 to provide a floor for the conveyor trough in its laterally swung positions. A pair of hydraulic cylinders 24 are connected between respective sides of rear boom 22 and wing portions 23.

A drive unit 26 mounted on one side of boom 22 provides power for driving a cross shaft 34 and sprocket 36.

A universal chain 27 is vertically and laterally flexible as a result of perpendicularly disposed pivotal axes 28 and 29. Chain 27 extends longitudinally along bottom 18 between sidewalls 17 and returns underneath bottom 18 to form an orbital endless chain driven by sprocket 36.

Flights 31 are connected to chain 27 at regular intervals, for lateral extension outwardly from either side thereof toward sidewalls 17. As shown in FIGS. 2 and 3, flight 31 has a T-shape cross section, but may be of other shapes as well. Each of extension members 32 is slotted to form a cavity adapted to embrace a flight 31 for telescopic sliding movement. A follower 33 extends upwardly from the end of flight extension 32 and has a profile which tapers forwardly and rearwardly. As seen more clearly in FIG. 2, follower 33 is engageable with guideway 37 provided in restraining channel 38.

Similar guideways are provided below bottom plate 18. Guideways for the return run are inverted to receive followers 33 of inverted flight extensions 32. Return guideways would diverge toward the front of conveyor 10 to pull extensions 32 outwardly to the fullest extent. When a flight 31 is at the front end of conveyor 10, follower 33 is engaged with guideway 37 holding extensions 32 outwardly near sidewalls 17. Flight 31, together with extension 32, provides a sweep which extends from the chain to the sidewalls. A pair of flights and extensions projecting from opposite sides of the chain would sweep substantially the full width of the conveyor bottom.

As the flight moves rearwardly along the conveyor, extension 32 encounters the converging sidewall 17 and is forced to telescope on flight 31 by the guideway 37 and follower 33. Thus, as the conveyor becomes narrower to form a channel, the effective width of the flight and extension combinaton becomes narrower.

In operation, material is piled on the forward end or mouth portion of conveyor 10. The portion of material directly above the chain, flight and extension combination moves rearwardly with the chain and encounters converging sidewalls 17. The moving load of material is contoured to conform to the width of the channel portion of the trough and in so doing becomes deeper.

Thus is provided apparatus for transforming a wide thin bed of material into a deeper narrower bed for efficient transfer to other haulage devices such as shuttle cars.

While I have shown a preferred embodiment of my invention, it is to be understood that other forms can be practiced within the spirit of the invention and the scope of the following claims.

I claim:
1. In a conveyor;
   an elongated trough having a bottom and a pair of sidewalls, the spacing between said sidewalls varying along the length of said trough to provide a relatively wider loading station adjacent a relatively narrower conveying channel;
   an endless orbitally movable chain adapted to move along the length of said trough between said sidewalls;
   a plurality of flights extending from opposite sides of said chain toward respective of said sidewalls;
   movable extension members embracing respective of said flights for sliding movement toward and from said sidewalls; and
   means urging said extension members toward said side- sidewalls to provide a sweep extending across the width of said trough at any position along the length thereof.

2. In a conveyor;
an elongated trough having a bottom and a pair of spaced sidewalls, the spacing between said sidewalls varying along the length of said trough;
a chain movable along the central length of said trough;
a flight projecting laterally from each side of said chain toward said sidewalls, said flights terminating short of said sidewalls;
a movable extension member connected to said flights for sliding movement toward and from said sidewalls; and guide means secured to said trough;
slidably engaging one end of each extension for moving each said extension member toward and from said sidewalls as the chain moves along the length of the trough.

3. In a conveyor;
an elongated trough defined by a bottom and a pair of spaced sidewalls, the spacing between said sidewalls varying along the length of said trough to provide a relatively wider loading station adjacent a relatively narrower conveying channel, said channel being laterally flexible in a plane parallel to said bottom;
an endless orbitally movable chain adapted to move along the length of said trough between said sidewalls, said chain being flexible in planes parallel and perpendicular to said bottom;
a plurality of flights extending from opposite sides of said chain toward respective of said sidewalls;
movable extension members embracing respective of said flights for sliding movement toward and from said sidewalls; and
means urging said extension members toward said sidewalls to provide a sweep extending across the width of said trough at any position along the length thereof.

4. In a conveyor;
an elongated trough defined by a bottom and a pair of spaced sidewalls, the spacing between said sidewalls varying along the length of said trough to provide a relatively wider loading station adjacent a relatively narrower conveying channel;
a pair of guideways in said trough, each extending parallel to one of said sidewalls;
an endless orbitally movable chain adapted to move along the length of said trough between said sidewalls;
a plurality of flights extending from opposite sides of said chain toward respective of said sidewalls;
movable extension members embracing respective of said flights for sliding movement toward and from said sidewalls; and
follower means connected to said extension members adapted to engage respective of said guideways, effective to move respective extension members toward and from said chain to maintain a predetermined relationship to respective of said sidewalls.

5. In a conveyor for a mobile machine;
an elongated trough disposed along the longitudinal axis of the frame of said machine, said trough being defined by a bottom and a pair of spaced sidewalls, the spacing between said sidewalls varying along the length of said trough to provide a relatively wide loading mouth at one end thereof and a relatively narrow channel extending from said mouth to the opposite end thereof, said channel being laterally flexible in a plane parallel to said bottom to provide a swingable discharge boom;
a pair of guideways in said trough, each extending parallel to one of said sidewalls;
an endless orbitally movable chain having a portion adapted to move along the length of said trough between said sidewalls, said chain being flexible in planes parallel and perpendicular to said bottom;
a plurality of flights extending from opposite sides of said chain toward respective of said sidewalls;
movable extension members embracing respective of said flights for sliding movement toward and from said sidewalls; and
follower means connected to said extension members adapted to engage respective of said guideways, effective to move respective extension members toward and from said chain to maintain a predetermined relationship to respective of said sidewalls.

References Cited by the Examiner

UNITED STATES PATENTS

| 633,202 | 9/1899 | Lamm. | |
| 2,493,942 | 1/1950 | Bingham | 198—168 X |
| 2,793,737 | 5/1957 | Sandeman et al. | 198—170 |

EVON C. BLUNK, *Primary Examiner.*

R. HICKEY, *Assistant Examiner.*